June 24, 1930.  V. V. HERMAN  1,768,404
FOG, FROST, AND SNOW ELIMINATOR
Filed Oct. 31, 1929
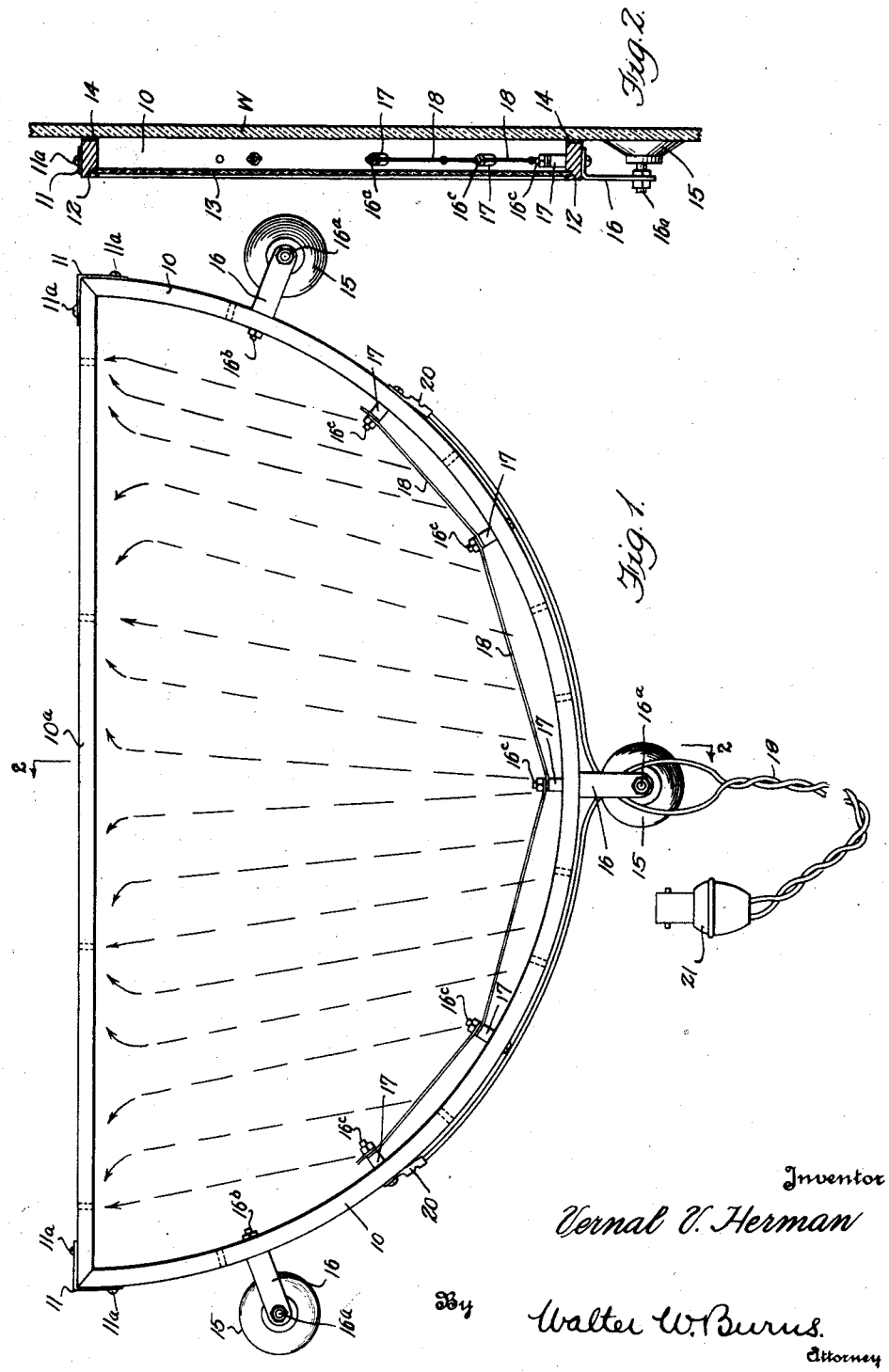

Patented June 24, 1930

1,768,404

UNITED STATES PATENT OFFICE

VERNAL V. HERMAN, OF VANCOUVER, WASHINGTON

FOG, FROST, AND SNOW ELIMINATOR

Application filed October 31, 1929. Serial No. 403,688.

My invention relates to improvements in a device for attachment to windows which are exposed on one side to wet or freezing weather conditions.

The invention is adapted for use on all windows where unfavorable weather conditions are liable to obscure the view therethrough and is particularly adapted for use on windows of automobiles, buses, trucks, locomotive cabs, ships' lookouts, airplanes and balloons.

During inclement weather the presence of precipitated moisture, the formation of frost or the deposit of snow on window surfaces will obscure the vision through the windows. This is true, particularly on windows of vehicles. In order to keep the surface of windows and wind shields clear so that an unobstructed vision may be had, it is necessary to keep the surface free of even small particles of moisture or frost as even a very thin film of this moisture or frost prevents a clear vision.

The primary object of my invention is the provision of an improved means for warming the surface of a transparent window so that its outside surface will be kept clear of moisture, frost and snow, thus insuring a clear vision.

Another object of my invention is the provision of such a device which is of a shape to warm a minimum amount of window surface consistent with the giving the necessary vision and warm the area of the windshield covered by the wind shield wiper when one is used.

Another and further object of my invention is the provision of such a heating device which may be quickly installed on or removed from a window such as a wind shield of an automobile and which is of a shape to warm an area of the window corresponding to that covered by a common form of window wiper.

Other and further objects of the invention will be apparent to those skilled in the art, from a reading of the complete specification and claims.

Referring to the drawing wherein I have illustrated an embodiment of my invention attached to the wind shield of a motor vehicle:

Figure 1 is a view of the device as seen from the inside of the window on which it is used.

Figure 2 is a cross section on the line 2—2 of Figure 1.

In the drawing, the same reference characters refer to the same or similar parts throughout the views.

The numeral 10 designates the body or frame member of my device which may be made of any suitable material. In the form shown, this frame 10 is made of an insulating material as a thin strip of wood. In this illustrated form, I have shown this frame of a substantially semicylindrical form having a top piece $10^a$ with its ends registering with the ends of the frame 10. A binding means as the angle strip 11, may be used with the screws $11^a$, to hold the parts 10 and $10^a$ together.

The parts 10 and $10^a$ are provided adjacent their inner edge and on their inside surfaces, with a continuous groove 12 in which rests the edge of the transparent member 13, which in the embodiment illustrated is of glass. The shape of the frame member 10 and the transparent member 13 as illustrated, is of substantially the outline of the surface of the window which is cleared by one type of windshield wiper.

The particular shape of the device to make it adapted for use with a wind shield wiper and reduce the amount of window to be heated, is an important feature of my invention. This shape, gives the required amount of vision, taking in the necessary cone of sight while reducing the amount of heat used to a minimum. It further reduces the amount of material used for the amount of vision obtained and reduces the cost of construction and tendency to develope trouble since there are fewer joints to be made.

The frame members 10 and $10^a$ are provided on their edges, which are to be adjacent the surface to be warmed, with suitable gasket means, such as a strip of felt 14, to prevent the entry of dust and dirt and to prevent any tendency to rattle.

In order to secure the device as a whole to the window to be warmed, as at W in Figure 2, I may provide any suitable means such as rivets, nails, screws, glue, cement tape or any other suitable means. In the form illustrated, I have shown the well known vacuum cups 15, at the sides and bottom. These vacuum cups are secured to the frame member 10 by small brackets 16 which are secured to the cups and frame by suitable small bolts 16ª, 16ᵇ and in the case of the lower bracket 16, by a longer bolt 16ᶜ. The relation of the brackets, cups and the felt edging 14 is such that the device is held snugly against the surface of the wind shield or other window to which the device is attached.

Spaced along the bottom and inside of the frame are bolts 16ᶜ similar to and including the bolt 16ᶜ which holds the lower bracket 16 in place. Small hollow cylindrical members 17 surround the bolts 16ᶜ and serve to space a resistance heating wire 18 which is supported throughout its length by these bolts 16ᶜ.

This heating wire 18 which is held spaced from the walls of the chamber within the frame member 10 is connected at its ends by an insulated wire 19 through connectors 20 to a plug 21. The plug is adapted for connection to any suitable source of current as the lighting circuit of a motor vehicle.

To permit a small amount of air to enter the chamber within the device, to promote circulation, I may provide vent holes 22 in the member 10 as shown in Figure 1. Likewise, I may provide similar openings 22ª in the frame member 10ª to permit a small amount of air to escape.

In operation, with the heating device in proper position as illustrated and the plug 21 connected to a source of electrical energy, the resistance heating wire 18, heats the air within the chamber. This air rises in its circulation, warms the surface of the wind shield or other window W, causing the frost or other foreign substance to be easily removable from the outside of the window. In addition, there is a circulation of air within the chamber, upwardly on the inside glass and downwardly along the surface of the windshield.

While I have shown and described in detail an embodiment of my invention, I desire to have it understood that the showing and description are merely illustrative and that modifications and changes as to form, shape and material may be made without departing from the spirit of the invention and within the scope of the appended claims.

Having described my invention in detail, what I claim and desire to be secured by Letters Patent is:—

1. A fog, frost and snow eliminator for the inside of windows comprising a body having a substantially semicylindrical chamber, a transparent side and an opposite open side to be closed by the window surface to be warmed and means for warming the air within the chamber, the body being of a size and having such proportions that when installed on a window with its straight side uppermost and with the pivot of a pivoted wind-shield wiper adjacent the center of the straight side of the body, the windshield wiper will have its field of operation within the area of the wind-shield warmed by the chamber and with the outer edge of the field of operation adjacent the outer edge of the area of the wind-shield warmed.

2. A fog, frost and snow eliminator for the inside of windows comprising a body having a semicylindrical chamber, a transparent side wall and an opposite open side for closure by the window surface to be warmed, electric heating means within the chamber for heating the air therein and vents at different levels to assist the circulation of air along the window surface, the body being of a size and having such proportions that when installed on a window with its straight side uppermost and with the pivot of a pivoted wind-shield wiper adjacent the center of the straight side of the body, the wind-shield wiper will have its field of operation within the area of the wind-shield warmed by the chamber and with the outer edge of the field of operation adjacent the outer edge of the area of the wind-shield warmed.

3. A fog, frost and snow eliminator for the inside of windows, comprising a body having a semicylindrical chamber, a transparent side wall and an opposite side for closure by the window surface to be warmed and an elongated electric heating unit spaced adjacent to and along the bottom of the chamber, the body being of a size and having such proportions that when installed on a window with its straight side uppermost and with the pivot of a pivoted wind-shield wiper adjacent the center of the straight side of the body, the wind-shield wiper will have its field of operation within the area of the wind-shield warmed by the chamber and with the outer edge of the field of operation adjacent the outer edge of the area of the wind-shield warmed.

4. A fog, frost and snow eliminator for the inside of windows, comprising a body having a semicylindrical chamber, a transparent side wall and an opposite side for closure by the window surface to be warmed, an elongated electric heating unit spaced adjacent to and along the bottom of the chamber, inlet vent holes below and adjacent to the electric heating unit, outlet vent holes at the top of the body and vacuum cup means for holding the body close to the window surface, the body being of a size and having such proportions that when installed on a window with its straight side uppermost and with the pivot of a pivoted wind-shield wiper adjacent the center of the straight side of the body, the wind-shield wiper will have its field of operation within the area of the wind-shield warmed by the chamber and with the outer edge of the field of operation adjacent the outer edge of the area of the wind-shield warmed.

VERNAL V. HERMAN.